(12) United States Patent
Kreitzer

(10) Patent No.: US 10,304,063 B2
(45) Date of Patent: May 28, 2019

(54) SHARED ADVERTISING WITH VIRTUAL WORLDS

(75) Inventor: Stuart S. Kreitzer, Coral Springs, FL (US)

(73) Assignee: Google Technology Holdings LLC, Mountain View, CA (US)

( * ) Notice: Subject to any disclaimer, the term of this patent is extended or adjusted under 35 U.S.C. 154(b) by 2036 days.

(21) Appl. No.: 11/954,997

(22) Filed: Dec. 12, 2007

(65) Prior Publication Data

US 2009/0157493 A1 Jun. 18, 2009

(51) Int. Cl.
*G06Q 30/00* (2012.01)
*G06Q 30/02* (2012.01)

(52) U.S. Cl.
CPC ......... *G06Q 30/02* (2013.01); *G06Q 30/0273* (2013.01); *G06Q 30/0241* (2013.01)

(58) Field of Classification Search
CPC .............. G06Q 30/02; G06Q 30/0239; G06Q 30/0273; G06Q 30/0209
USPC ........................................................ 705/14
See application file for complete search history.

(56) References Cited

U.S. PATENT DOCUMENTS

| 6,753,883 | B2 | 6/2004 | Schena et al. | |
|---|---|---|---|---|
| 2003/0074561 | A1* | 4/2003 | Guenther | G06F 21/10 713/176 |
| 2004/0059708 | A1 | 3/2004 | Dean et al. | |
| 2006/0155597 | A1* | 7/2006 | Gleason | G06Q 30/02 705/14.12 |
| 2008/0162260 | A1* | 7/2008 | Rohan et al. | 705/10 |
| 2008/0163379 | A1* | 7/2008 | Robinson | G06F 3/04815 726/27 |

OTHER PUBLICATIONS

Paul Hemp, "Avatar-Based Marketing", Jun. 2006, Harvard Business Review, pp. 48-57 (Year: 2006).*

* cited by examiner

*Primary Examiner* — Ryan D Donlon
*Assistant Examiner* — Irene S Kang
(74) *Attorney, Agent, or Firm* — Fish & Richardson P.C.

(57) ABSTRACT

A method (400, 500) of advertising. The method can include communicating to a client (106) a hyperlink corresponding to a virtual world (300) and associating with the hyperlink an identifier corresponding to an advertisement (302) to be presented to a user (108) in the virtual world during a user session. The method also can include identifying an identifier (114) corresponding to an advertisement to be displayed in a virtual world during a user session in response to receiving a request (116) from a client identifying a uniform resource identifier corresponding to the virtual world, and presenting the advertisement within the virtual world during the user session. A method (600) of providing financial incentives for advertising can include receiving an advertising activity indicator (120, 122) and processing the advertising activity indicator to determine financial incentives to be provided to an entity associated with the website.

19 Claims, 3 Drawing Sheets

SHARED ADVERTISING WITH VIRTUAL WORLDS

BACKGROUND OF THE INVENTION

Field of the Invention

The present invention generally relates to methods of advertising and, more particularly, to Internet based advertising.

Background of the Invention

In a massive multiplayer online game (MMOG), for example World of Warcraft® or Second Life®, a very large number of participants who are communicatively linked via a network, such as the Internet, can interact in a commonly shared virtual environment, also known as a "virtual world." For example, the participants can explore the virtual world, meet others, game with others, socialize, and participate in individual and group activities. MMOG participants also create and trade virtual items and virtual services with one another.

Over the last decade the popularity of MMOGs has grown significantly. Indeed, worldwide there are currently tens of millions of MMOG participants. With such large numbers, MMOG participants represent a lucrative target audience for advertisers. Currently, however, options to target advertising to MMOG participants are rather limited.

SUMMARY OF THE INVENTION

The present invention relates to a method of advertising. The method can include communicating to a client a hyperlink corresponding to a virtual world and associating with the hyperlink an identifier corresponding to an advertisement to be presented to a user in the virtual world during a user session.

Associating the identifier with the hyperlink can include communicating to the client a uniform resource identifier (URI) parameter that identifies the advertisement and/or communicating to the client a parcel of text that identifies the advertisement. Responsive to a user selection of the hyperlink, an advertisement activity indicator can be communicated to an advertisement activity monitor.

The advertisement can be presented to the user at a particular location within the virtual world, or at a plurality of locations in the virtual world. In another arrangement, the advertisement can be continuously presented to the user in the virtual world.

The present invention also relates to a method of advertising that includes identifying an identifier corresponding to an advertisement to be displayed in a virtual world during a user session in response to receiving a request from a client identifying a uniform resource identifier corresponding to the virtual world. The method also can include presenting the advertisement within the virtual world during the user session. Identifying the identifier can include identifying a uniform resource identifier (URI) parameter communicated in the request, the URI parameter identifying the advertisement. In another arrangement, identifying the identifier can include identifying a parcel of text communicated in the request, the parcel of text identifying the advertisement.

Presenting the advertisement within the virtual world can include communicating to the client a hyperlink that includes a URI. In response to a user selection of the advertisement during the user session, an advertisement activity indicator can be communicated to an advertisement activity monitor. Further, in response to a user selection of the advertisement during the user session, an advertisement activity indicator can be communicated to an advertisement activity monitor. The advertisement activity indicator can include data that indicates that a user linked to the virtual world from a website.

During the user session, a hyperlink can be associated with the advertisement and communicated to a client. The hyperlink can include a URI parameter associated with a website or another virtual world. Further, during the user session, a hyperlink can be associated with a second advertisement and communicated to a client. Such hyperlink also can comprise a URI parameter associated with a website or another virtual world.

Presenting the advertisement within the virtual world can include presenting the advertisement at a particular location within the virtual world, presenting the advertisement at a plurality of locations in the virtual world, or continuously presenting the advertisement.

The present invention also relates to a method of providing financial incentives for advertising. The method can include receiving an advertising activity indicator which includes data that indicates that a user linked to a virtual world from a website, and processing the advertising activity indicator to determine financial incentives to be provided to an entity associated with the website. The method also can include processing the advertising activity indicator to determine financial incentives to be provided to an entity associated with a virtual world server hosting the virtual world.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
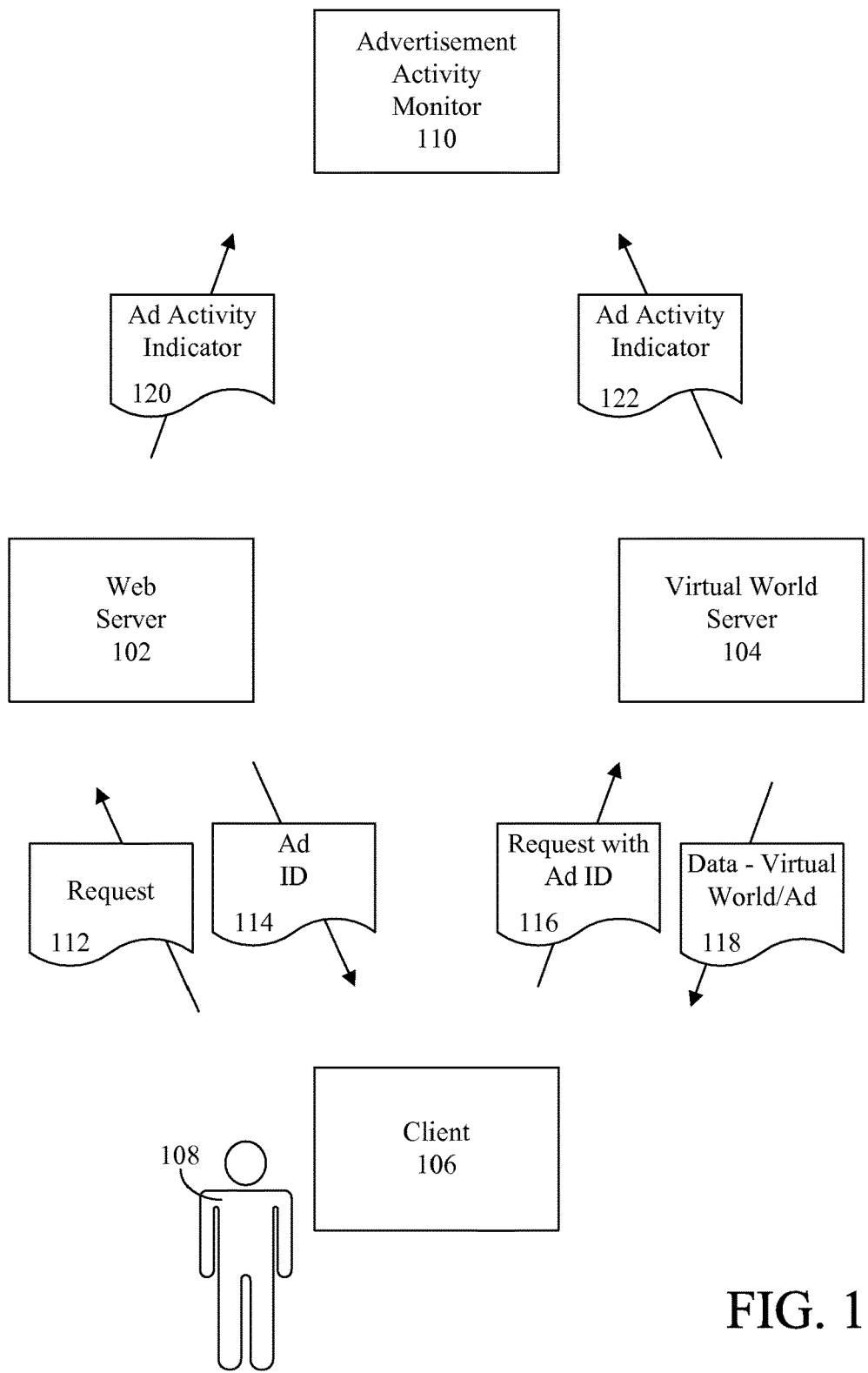
FIG. 1 depicts a system that is useful for understanding the present invention.

Arrangements disclosed herein relate to shared advertising among virtual worlds, websites, multimedia files, and other electronic objects. FIG. 1 depicts a system 100 that is useful for understanding the present invention. The system 100 can include a web server 102, a virtual world server 104 and a client 106. The web server 102 can be a server that hosts one or more websites that may be accessed by clients, such as the client 106. The web server 102 also can provide media content to clients. Such media content can include, for example, audio files, video files, audio/video files, image files, and the like. Web servers are well known to the skilled artisan.

The virtual world server 104 can be a server that hosts virtual worlds. For instance, the virtual world server 104 can host one or more online games which utilize virtual worlds, examples of which include, but are not limited to, massive multiplayer online games (MMOGs). As such, the virtual world server 104 can present virtual worlds to users who access the virtual world server 104 via their client devices. For example, via the client 106, the virtual world server 104 can present one or more virtual worlds to a user 108 of the client 106. As used herein, a "virtual world" is a computer-simulated environment intended for its users to inhabit and interact via avatars. As used herein, an "avatar" is a visual representation of a user, or a user's character, in a virtual world. For example, an avatar can be a multi-dimensional picture or model. Virtual world servers, virtual worlds and avatars are each well known to the skilled artisan.

The client 106 can be any device with which the user 108 may interface to access the web server 102 and the virtual world server 104. For example, the client device can be a computer, a mobile station (e.g. a mobile computer, a personal digital assistant, a mobile telephone, a mobile radio, or the like), a gaming console, a television, an audio/video system, a set-top box, an access terminal, a network appliance, or any other device(s) which may be suitably configured to present web pages and virtual worlds to the user 108.

The client 106 can communicate with the web server 102 and the virtual world server 104 via any suitable communications network (not shown). Suitable communications networks can comprise a wide area network (WAN), such as the Internet, the World Wide Web, an interconnect communications network (e.g. a cellular communications network), a public switched telephone network (PSTN), and the like. A suitable communications network also may comprise a local area network (LAN), a metropolitan area network (MAN), a WiFi network, a Mesh network, and/or any other networks or systems over which communication signals can be propagated. In that regard, the communications network can include wired and/or wireless communication links, and the communications network can be implemented in accordance with any suitable communications standards, protocols, and/or architectures, or a suitable combination of such standards, protocols, and/or architectures.

Optionally, the system 100 also can include an advertisement activity monitor 110. The advertisement activity monitor 110 can be a device that suitably tracks the number of times advertisements are viewed on web pages, within virtual worlds, and/or within media content. The advertisement activity monitor 110 also can track the number of times advertisements are selected by users, for instance by a user input received by the client 106. For example, the advertisement activity monitor 110 can be a server communicatively linked to the web server 102, virtual world server 104 and/or client 106 via the communications network. Accordingly, financial incentives can be provided to operators of the web server 102 and/or the virtual world server 104 for advertisement activity that is generated, as will be described herein.

In operation, the client 106 can connect to the web server 102 to access one or more web pages, or to download media content. For instance, the client 106 can communicate a request 112, such as a hypertext markup language (HTML) request, that indicates a uniform resource identifier (URI) associated with the web server 102. By way of example, the request 112 can indicate a particular web page within a website hosted by the web server 102, or can indicate requested media content.

In response to the request 112, the web server 102 can communicate to the client 106 the web page or media content that corresponds to the URI indicated by the request 112. The web server 102 also can communicate to the client 106 an advertisement identifier 114 which identifies an advertisement that may be presented to the user if the user accesses the virtual world server 104 from the web page. The advertisement identifier 114 can comprise a URI parameter or a parcel of text (e.g. a cookie) embedded within code or script associated with the web page or media content, or communicated to the client 106 independent of the web page or media content. For instance, the advertisement identifier 114 can be communicated to the client 106 after the web page code or media content has been communicated, in response to a user selection of a field or object within the web page or media content, or at any other suitable time. URI parameters and parcels of text are well known to those skilled in the art.

Figure 2:
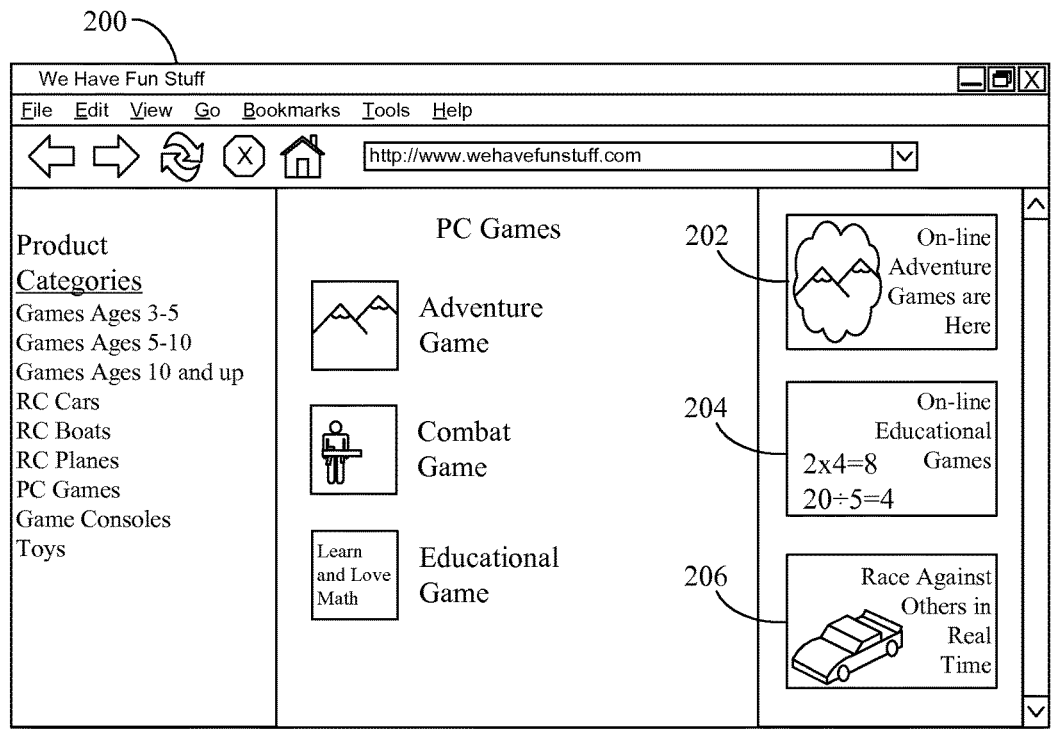
FIG. 2 depicts a view of a web page that is useful for understanding the present invention.

FIG. 2 depicts an example of a view of a web page 200 that is useful for understanding the present invention. In this example, the web page 200 can present one or more advertisements 202, 204, 206 via the client 106 (e.g. via a display of the client 106). As noted, however, the invention is not limited in this regard and in alternate arrangements such advertisements 202-206 can be presented in media content communicated to the client 106 from the web server 102.

Referring to both FIGS. 1 and 2, at least one of the advertisements 202-206 can be associated with a hyperlink corresponding to a virtual world hosted by the virtual world server 104. A hyperlink can be activated in any suitable manner, for example by selecting an advertisement using a cursor, keyboard or keypad, or using a stylus or appendage (e.g. on a touch screen display).

In response to a user selecting an advertisement 202, the hyperlink can automatically connect the client 106 to the virtual world server 104. For example, selection of the advertisement 202, the hyperlink can trigger a request to be communicated to the virtual world server 104. The request 116 can include the advertisement identifier 114. For example, if the advertisement identifier 114 comprises a URI parameter, the URI parameter can be appended to the URI indicated by the hyperlink. Alternatively, if the advertisement identifier 114 comprises embedded text, the embedded text can be included in a header, body or footer of the request 116. In yet another arrangement, the advertisement identifier 114 can be passed to the virtual world server 104 after a user session has been established between the client 106 and the virtual world server 104.

In response to the request 116, the virtual world server 104 can establish a user session with the client 106. Further, the virtual world server 104 can communicate data 118 for rendering a virtual world on the client 106, for instance on a display. Notably, the data 118 also can include the advertisement indicated by the advertisement identifier 114 such that the virtual world may be rendered so as to include the identified advertisement.

Figure 3:
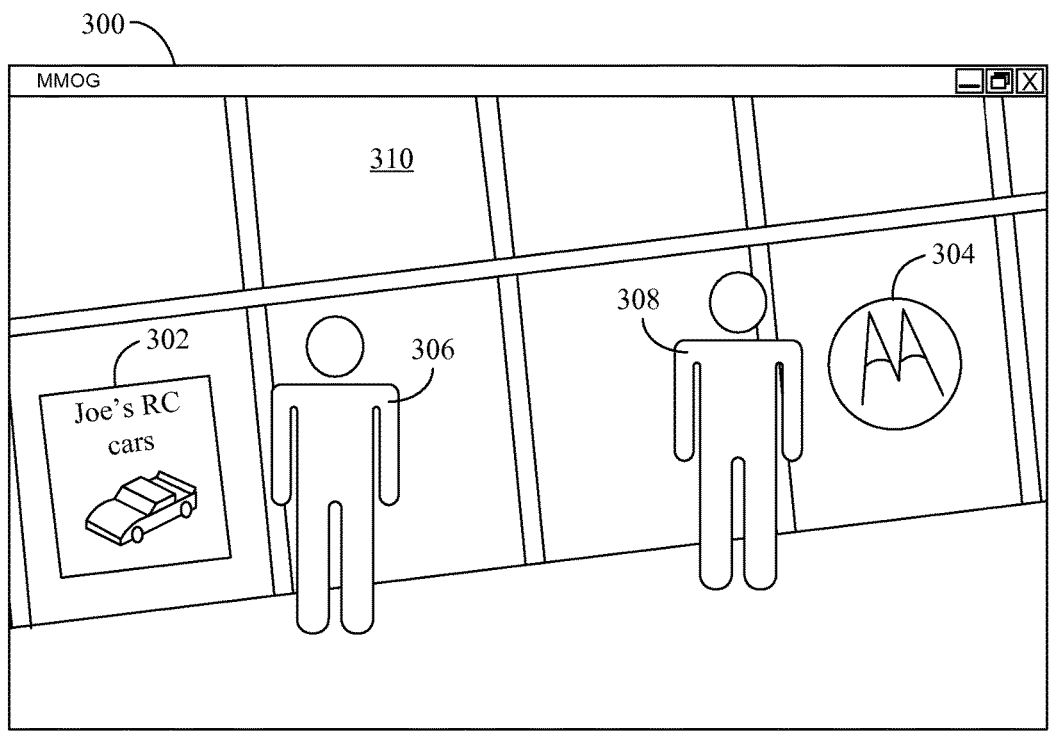
FIG. 3 depicts a view of a virtual world that is useful for understanding the present invention.

FIG. 3 depicts an example of a view of a virtual world 300 that is useful for understanding the present invention. One or more advertisements 302, 304 and one or more avatars 306, 308 can be presented in the virtual world 300. Referring to FIGS. 1, 2 and 3, at least one of the advertisements 302, 304, for example the advertisement 302, can correspond to the advertisement identifier 114, though other advertisements 304 also can be presented. For example, the advertisement 304 can be an advertisement that is presented to any users having an associated avatar 306, 308 within the virtual world 300, while the advertisement 302 can be exclusively presented to users who linked to the virtual world 300 by selecting the advertisement 202 on the web page 200 (or other web page on which a similar advertisement is presented).

In one arrangement, the advertisement 302 can remain at a particular location 310 within the virtual world 300. Thus, the advertisement 302 can remain visible to the user 108 (e.g. remain present on a display of the client 106) while the avatar 306 associated with the user 108 remains at a particular location 310. Alternatively, the advertisement 302 can remain on the display of the client 106 such that the advertisement 302 is continuously presented to the user 108 as the avatar 306 moves about the virtual world 300, regardless of where the avatar 306 ventures. In yet another arrangement, the advertisement 302 can be presented at a plurality of locations within the virtual world 300, and thus can be presented to the user 108 whenever the avatar 306 moves into proximity of such locations.

As with the advertisements 202-206, the advertisements 302, 304 also can be associated with respective hyperlinks corresponding to other virtual worlds and/or other websites. Further, the virtual world server 104 also can communicate advertisement identifiers 114 to the client 106. As noted, such advertisement identifiers 114 can comprise URI parameters or parcels of text such that when an advertisement 302, 304 is selected in a suitable manner, a user session can be established with another website or virtual world, and one or more advertisements corresponding to the advertisement identifier 114 can be presented in the other website or virtual world.

Further, in response to the user 108 selecting the advertisement 202 on the web page 200 (or within media content), an advertisement activity indicator 120 can be communicated from the web server 102 to the advertisement activity monitor 110. Similarly, in response to the user 108 selecting the advertisement 302 in the virtual world 300, an advertisement activity indicator 122 can be communicated from the virtual world server 104 to the advertisement activity monitor 110.

As noted, financial incentives can be provided to operators of the web server 102 and/or the virtual world server 104 for advertisement activity that is generated. For example, financial incentives can be provided to an entity associated with the web server 102 each time an advertisement 202-206, and thus any associated hyperlinks, is presented on the web page 200 (or in media content). Such entity can be an operator of the web server 102 or another designated entity. Similarly, financial incentives can be provided to an entity associated with the virtual world server 104 each time an advertisement 302, 304, and any associated hyperlinks, within the virtual world 300 is selected by a user 108. Such entity can be, for example, an operator of the virtual world server 104 or another designated entity.

Further, because the web server 102 provided the hyperlink used by the user 108 to access the virtual world 300, financial incentives can be provided to an entity associated with the web server 102 each time an advertisement 302, 304 within the virtual world 300 is selected by a user 108.

In such arrangements, the advertisement activity indicator 122 can include data that indicates that the user linked to the virtual world 300 from a website or media content provided by the web server 102. For example, the advertisement activity indicator 122 can include the advertisement identifier 114 and/or an identifier that identifies the web page 200 and/or the web server 102. Such identifiers can be processed to determine the financial incentives to be provided.

Financial incentives also can be provided to an entity associated with the virtual world server 104 each time an advertisement is selected on a web page, in media content, or in another virtual world by a user who linked to such web page, media content, or other virtual world from the virtual world 300. Again, a corresponding advertisement activity indicator can include the appropriate advertisement identifier or other suitable data, and can be processed to determine the financial incentives to be provided.

Figure 4:
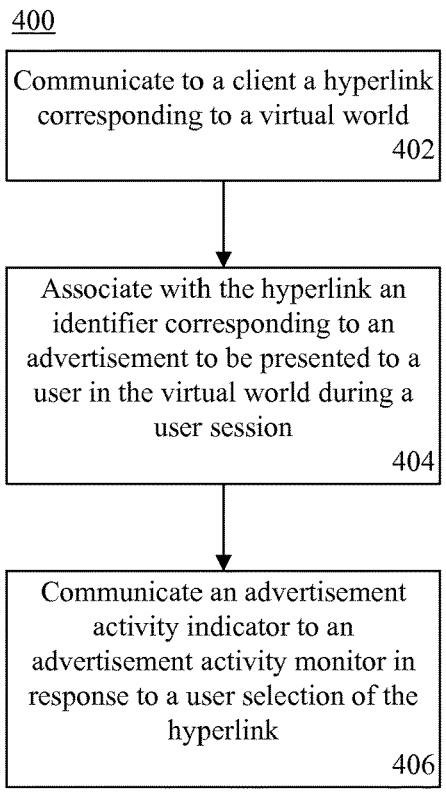
FIG. 4 is a flowchart which presents a method that is useful for understanding the present invention.

FIG. 4 is a flowchart which presents a method 400 that is useful for understanding the present invention. At step 402, a hyperlink corresponding to a virtual world can be communicated to a client. At step 404, the hyperlink can be associated with an identifier corresponding to an advertisement to be presented to the user in the virtual world during a user session. Associating the identifier with the hyperlink can include communicating to the client a uniform resource identifier (URI) parameter that identifies the advertisement and/or communicating to the client a parcel of text that identifies the advertisement. At step 406, an advertisement activity indicator can be communicated to an advertisement activity monitor in response to a user selection of the hyperlink.

Figure 5:
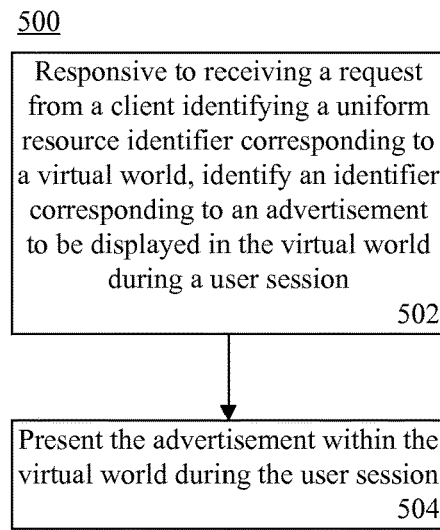
FIG. 5 is a flowchart which presents another method that is useful for understanding the present invention.
Figure 5:
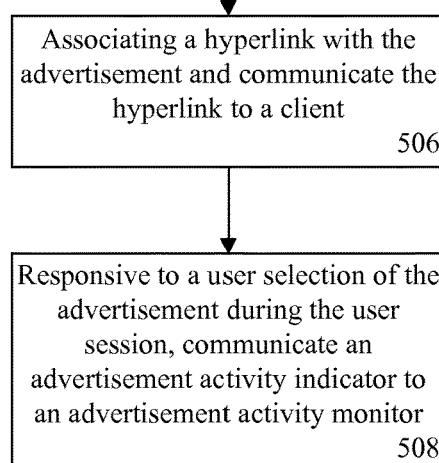

FIG. 5 is a flowchart which presents another method 500 that is useful for understanding the present invention. At step 502, responsive to receiving a request from a client identifying a uniform resource identifier corresponding to a virtual world, an identifier can be identified. The identifier can correspond to an advertisement to be displayed in the virtual world during a user session. At step 504, the advertisement can be presented within the virtual world during the user session. At step 506, a hyperlink can be associated with the advertisement and communicated to a client. Continuing to step 508, an advertisement activity indicator can be communicated to an advertisement activity monitor in response to a user selection of the advertisement during the user session.

Figure 6:
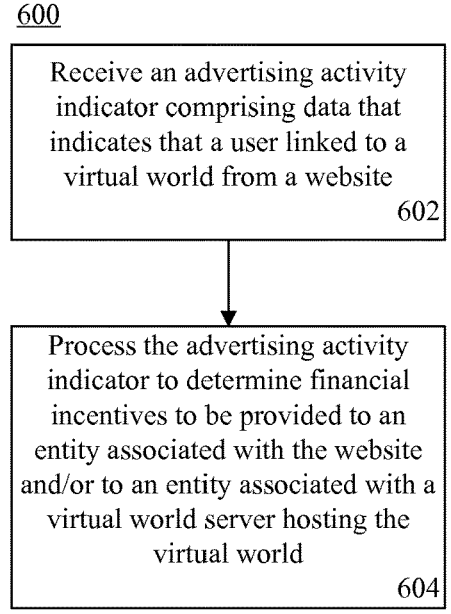
FIG. 6 is a flowchart which presents another method that is useful for understanding the present invention.

FIG. 6 is a flowchart which presents another method 600 that is useful for understanding the present invention. At step 602, an advertising activity indicator can be received. The advertising activity indicator can comprise data that indicates that a user linked to a virtual world from a website. At step 604, the advertising activity indicator can be processed to determine financial incentives to be provided to an entity associated with the website and/or to an entity associated with a virtual world server hosting the virtual world.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in a program storage device readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

This invention can be embodied in other forms without departing from the spirit or essential attributes thereof. Accordingly, reference should be made to the following claims, rather than to the foregoing specification, as indicating the scope of the invention.

What is claimed is:

1. A method of integrating advertising that was previously presented to a user on a webpage into a virtual world with which the user is interacting, comprising:
   via a first server, communicating, to a client, an advertisement that is presented on a web page that includes a hyperlink to a virtual world (i) that is a computer-simulated environment, (ii) that is hosted on a second server operated by a different entity than an entity that operates the first server, and (ii) that enables multiple different users to simultaneously interact within the virtual world via avatars;
   receiving data indicating that the first user selected the hyperlink to the virtual world;
   in response to receiving the data indicating that the first user selected the hyperlink to the virtual world, presenting, within the virtual world while the first user is interacting with the virtual world, the advertisement based on (i) the first user selecting the hyperlink to the virtual world and (ii) the hyperlink to the virtual world being included in the webpage that presented the advertisement, wherein the advertisement is not presented to a second user that is interacting with the virtual world at a same time as the first user, wherein the second user did not select an additional hyperlink to the virtual world while an additional webpage presented the advertisement and the additional hyperlink to the virtual world; and
   responsive to the advertisement being presented in the virtual world, providing a financial incentive to the different entity that operates the second server that hosts the virtual world.

2. The method of claim 1, wherein presenting the particular advertisement comprises communicating to the client a uniform resource identifier (URI) parameter that identifies the advertisement.

3. The method of claim 1, wherein presenting the advertisement comprises communicating to the client a parcel of text that identifies the advertisement.

4. The method of claim 1, further comprising:
   responsive to a user selection of the hyperlink to the virtual word, communicating an advertisement activity indicator to an advertisement activity monitor.

5. The method of claim 1, wherein the advertisement is presented to the user at a particular location within the virtual world.

6. The method of claim 1, wherein the advertisement is presented to the user at a plurality of locations in the virtual world.

7. The method of claim 1, wherein the advertisement is continuously presented to the user in the virtual world.

8. The method of claim 2, comprising:
   providing, for display on an additional web page that is accessed by the second user, the advertisement and a hyperlink to the virtual world;
   determining that the second user did not select the hyperlink to the virtual world; and
   based on determining that the second user did not select the hyperlink to the virtual world and based on the web page including the advertisement, generating data that relates an additional hyperlink with an additional identifier corresponding to an additional advertisement that is not related to the first advertisement, that is provided by an additional advertiser, and that is to be presented to the second user in the virtual world during a user session.

9. The method of claim 1, further comprising:
   causing the advertisement to continue to be visible to the first user within the virtual world as the first user moves about the virtual world, while not causing the advertisement to be visible to other users in the virtual world who did not select an additional hyperlink to the virtual world, wherein the additional hyperlink to the virtual world is included in an additional webpage that presented the advertisement.

10. A method of advertising, comprising:
   responsive to receiving a request from a client identifying a uniform resource identifier corresponding to a virtual world that is a computer-simulated environment, that is operated by an entity, and that enables multiple different users to simultaneously interact within the virtual world via avatars, via a server that hosts the virtual world, identifying an identifier corresponding to an advertisement that is provided by an advertiser and that is to be displayed in the virtual world during a user session of a first user, wherein the advertisement corresponds to the request from the client;

presenting, within the virtual world while the first user is interacting with the virtual world, the advertisement based on (i) the first user selecting a hyperlink to the virtual world and (ii) the hyperlink to the virtual world being included in a webpage that presented the first advertisement, wherein the advertisement is not presented to a second user that is interacting with the virtual world at a same time as the first user, wherein the second user did not select an additional hyperlink to the virtual world while an additional webpage presented the first advertisement and the additional hyperlink to the virtual world; and in response to a user selection of the advertisement during the user session of the first user, communicating an advertisement activity indicator to an advertisement activity monitor, the advertisement activity indicator comprising data that indicates (i) that a user linked to the virtual world from a website that included the advertisement and (ii) that indicates a financial incentive is to be provided to the entity that operates the virtual world.

11. The method of claim 10, wherein identifying the identifier comprises identifying a uniform resource identifier (URI) parameter communicated in the request, the URI parameter identifying the advertisement.

12. The method of claim 10, wherein identifying the identifier comprises identifying a parcel of text communicated in the request, the parcel of text identifying the advertisement.

13. The method of claim 10, wherein presenting the advertisement within the virtual world comprises communicating to the client a hyperlink comprising a URI.

14. The method of claim 10, further comprising:
during the user session, associating a hyperlink with the advertisement and communicating the hyperlink to a client, the hyperlink comprising a URI parameter associated with a website or another virtual world.

15. The method of claim 10, further comprising:
during the user session, associating a hyperlink with an additional advertisement and communicating the hyperlink to a client, the hyperlink comprising a URI parameter associated with a website or another virtual world.

16. The method of claim 10, wherein presenting the advertisement within the virtual world comprises presenting the advertisement at a particular location within the virtual world.

17. The method of claim 10, wherein presenting the advertisement within the virtual world comprises presenting the advertisement at a plurality of locations in the virtual world.

18. The method of claim 10, wherein presenting the advertisement within the virtual world comprises continuously presenting the advertisement.

19. A non-transitory computer-readable medium storing software comprising instructions executable by one or more computers which, upon such execution, cause the one or more computers to perform operations comprising:

via a first server, communicating, to a client, an advertisement that is presented on a web page that includes a hyperlink to a virtual world (i) that is a computer-simulated environment, (ii) that is hosted on a second server operated by a different entity than an entity that operates the first server, and (ii) that enables multiple different users to simultaneously interact within the virtual world via avatars;

receiving data indicating that the first user selected the hyperlink to the virtual world;

in response to receiving the data indicating that the first user selected the hyperlink to the virtual world, presenting, within the virtual world while the first user is interacting with the virtual world, the advertisement based on (i) the first user selecting the hyperlink to the virtual world and (ii) the hyperlink to the virtual world being included in the webpage that presented the advertisement, wherein the advertisement is not presented to a second user that is interacting with the virtual world at a same time as the first user, wherein the second user did not select an additional hyperlink to the virtual world while an additional webpage presented the advertisement and the additional hyperlink to the virtual world; and responsive to the advertisement being presented in the virtual world, providing a financial incentive to the different entity that operates the second server that hosts the virtual world.

* * * * *